United States Patent [19]

Mita et al.

[11] 4,310,559

[45] Jan. 12, 1982

[54] FROZEN CONFECTIONS HAVING STABILIZED ICE GRANULES THEREIN AND PROCESS FOR MAKING SAME

[75] Inventors: Kou Mita, Tokorozawa; Satoru Rokuta, Higashi-Murayama; Kiyoshi Takada, Higashi-Yamato; Fuziko Suzuki, Hannou, all of Japan

[73] Assignee: Snow Brand Milk Products Co., Ltd, Hokkaido, Japan

[21] Appl. No.: 129,320

[22] Filed: Mar. 11, 1980

Related U.S. Application Data

[63] Continuation-in-part of Ser. No. 6,494, Jan. 25, 1979, abandoned.

[30] Foreign Application Priority Data

Feb. 8, 1978 [JP] Japan .................................. 53-13291

[51] Int. Cl.³ .................................................. A23G 9/06
[52] U.S. Cl. .................................... 426/101; 426/249; 426/565
[58] Field of Search ............... 426/565, 566, 567, 101, 426/249

[56] References Cited

U.S. PATENT DOCUMENTS

| | | | |
|---|---|---|---|
| 2,863,776 | 12/1958 | Lisher | 99/136 |
| 2,970,919 | 2/1961 | Laurelton | 99/140 |
| 3,073,703 | 1/1963 | Dunn | 99/192 |
| 3,291,076 | 12/1966 | Flanigan | 426/565 |
| 3,360,384 | 12/1967 | Kurzinski et al. | 426/565 |
| 3,619,205 | 11/1971 | LeVan et al. | 99/78 |
| 3,671,268 | 6/1972 | Blake et al. | 99/136 |
| 3,914,440 | 10/1975 | Witzig | 426/130 |
| 4,031,262 | 6/1977 | Nakayama | 426/565 |
| 4,129,581 | 8/1980 | Dea et al. | 426/565 |

FOREIGN PATENT DOCUMENTS 136919 8/1974 United Kingdom .
150549 2/1978 United Kingdom .

*Primary Examiner*—Jeanette M. Hunter
*Attorney, Agent, or Firm*—Wegner & Bretschneider

[57] ABSTRACT

An improved frozen confection scattered with colored granules of ice can be provided by admixing colored granules of ice with frozen confection, the colored granules of ice being prepared by crushing colored block of ice containing a stabilizer into pieces and cryogenically refrigerating the surface of the pieces of ice.

8 Claims, 1 Drawing Figure

U.S. Patent
Jan. 12, 1982
4,310,559
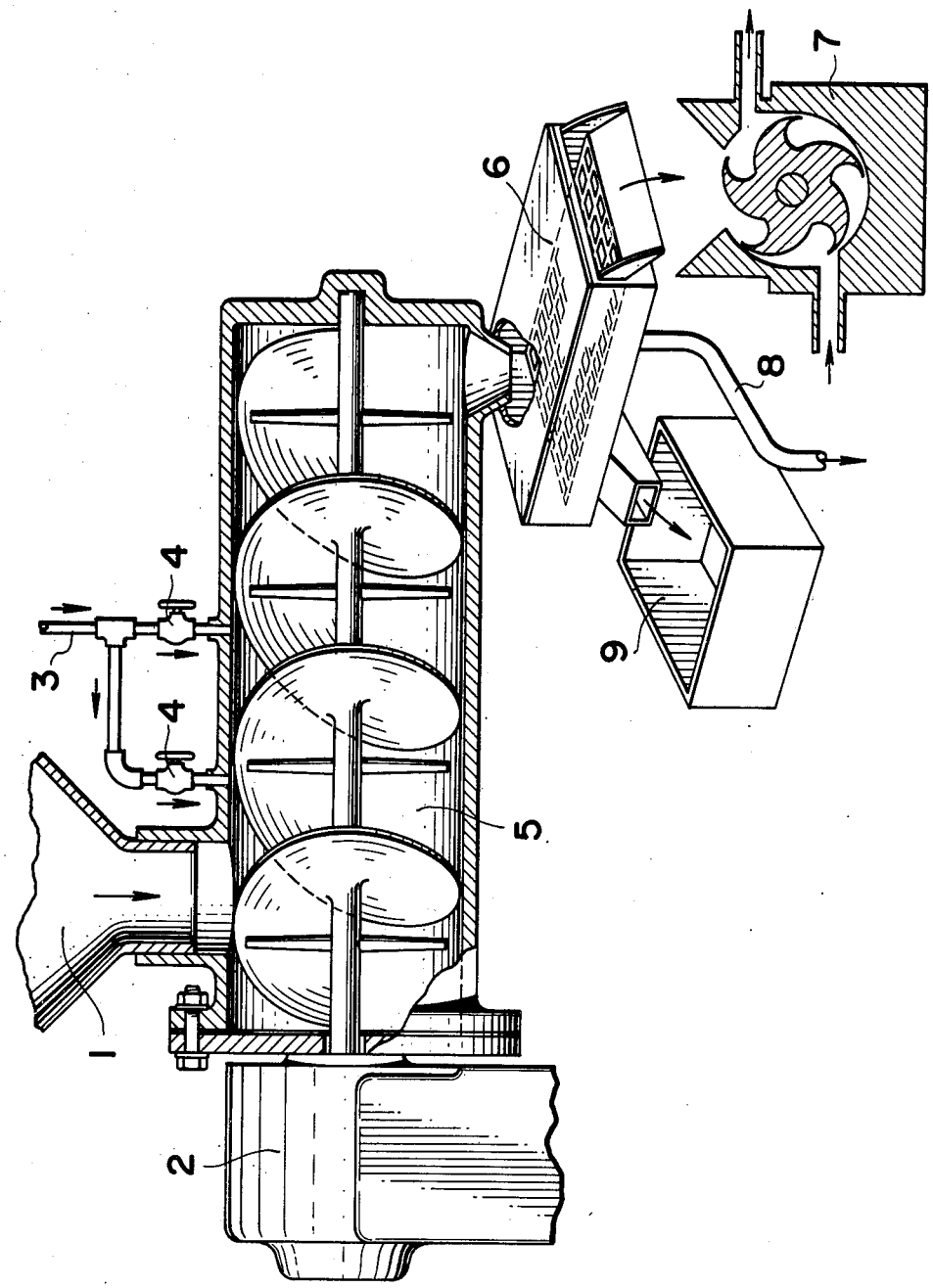

FROZEN CONFECTIONS HAVING STABILIZED ICE GRANULES THEREIN AND PROCESS FOR MAKING SAME

CROSS-REFERENCE TO RELATED APPLICATION

This application is a continuation-in-part of our copending application Ser. No. 6,494, filed Jan. 25, 1979 now abandoned.

BACKGROUND OF THE INVENTION

The present invention relates to a method for making frozen confections containing uniformly coloured granules of ice scattered in the confection. The term "coloured granules of ice" herein used means the granules of ice prepared from blocks of ice made by freezing an aqueous coloured liquid containing colouring agent or flavouring agent such as syrups, coffee and fruit juices.

Hitherto, as a method for preparing ice creams having scattered or admixed with granules of ice, Nakayama et al. offers a method in which soft ice cream and granules of ice of about 1 to 350 mm$^3$ in size are mixed and the mixture is frozen, in U.S. Pat. No. 4,031,262.

However, since in the above-mentioned method, in cases or preparing the granules of ice from the blocks of ice by crushing the blocks of ice and putting the crushed ice through a sieve to obtain the granules having a size within a certain range, the following defects are observed. That is, in cases of obtaining the coloured granules, (1) the blocks of ice made by freezing water coloured with one or more additives such as fruit juice, flavouring agents and edible colours have these additives concentrated in the center part of the blocks, and accordingly it is extremely difficult to obtain the blocks of ice uniformly coloured. Therefore, it is also extremely difficult to obtain the uniformly coloured granules of ice by crushing such as irregularly coloured block. And, (2) since the granules of ice obtained by crushing the blocks of ice have their surface melted, the granules adhere mutually to cause blocking, thus making the shifting of the granules into a size within a range very difficult.

Accordingly, the ice cream with granules of ice or coloured granules of ice is not possibly prepared in a continuous manner industrially and effectively by the method of U.S. Pat. No. 4,031,262.

While, U.S. Pat. No. 3,360,384 discloses a method for preparing an edible frozen product, in which discrete sub-cooled particles obtained by making an edible material such as juices, syrups and purees into contact with a cryogenic refrigerant to be sub-cooled at a temperature of lower than −100° F. (−73° C.) are combined with ice cream. However, since the sub-cooled particles have been prepared by making the material such as juices and syrups directly into contact with the cryogenic refrigerent at a temperature of lower than −100° F., they are fragile, and moreover, since these sub-cooled particles are mixed with ice cream at their state of being kept at an extremely low temperature of, for instance, −320° F. (−195° C.), the ice cream is to be excessively cooled, and as a result, there is a defect of deterioration of the texture of the ice cream product.

Furthermore, as a method of preparing the granules of ice, a method of spraying water within a super-cooled chamber or a method of freezing water by injecting water into a plate having a plurality of hollows suitable for shaping water into the form of granule is offered. However, these methods are not suitable for mass production in an industrial scale.

We, the inventors of the present invention, after studying the methods for preparing the frozen confections containing granules of ice, particularly the uniformly coloured granules of ice scattered throughout the same effectively in a manner of mass production and continuously have found that in the case of freezing an aqueous coloured liquid containing a stabilizer, the block of ice uniformly coloured in naked eyes is obtainable unexpectedly, and that in the case where the ice pieces obtained by crushing the thus obtained block are brought into contact with a refrigerant such as liquid nitrogen to refrigerate the surface of the ice pieces before sifting the pieces, the formation of the mutual adhesion of the pieces is prevented and the ice pieces having a brilliancy such as jewels are obtainable, and have been lead to the present invention.

BRIEF DESCRIPTION OF THE DRAWINGS

The drawing shows a schematic illustration of an apparatus for preparing the frozen confection according to the present invention.

DETAILED DESCRIPTION OF THE INVENTION

Accordingly, the purpose of the present invention is to offer a method suitable for industrially producing a frozen confection having scattered granules of ice uniformly coloured.

The other purpose of present invention is to offer a stable frozen confection enchased with the granules of ice shining like jewels. The other purposes of the present invention will be made clear from the following description:

The characteristic of the present invention comprises the following successive steps of crushing into pieces a block of ice uniformly coloured obtained by freezing an aqueous edible coloured liquid containing a stabilizer, bringing the thus obtained ice pieces into contact with a refrigerant to refrigerate their surfaces, sifting the thus refrigerated coloured ice pieces into those having a size within a range and admixing the shifted ice pieces uniformly coloured with a soft frozen confection.

That is, one of the important characteristics of the present invention is to prepare the coloured ice pieces from a coloured blocks of ice containing a stabilizer, and another important characteristic is to bring the ice pieces obtained by crushing the above-mentioned block of ice into contact with a refrigerant for an extremely short period of time to refrigerate the surface of these ice pieces in advance of the shifting of the pieces.

The term "refrigerant" herein used means liquid nitrogen, liquid carbon dioxide or liquid air, and the term "frozen confection" herein used means ice cream, iced milk, lactic ice, sherbet or the like.

The coloured granules of ice for use in the present invention are prepared as follows:

An edible, coloured aqueous liquid material containing at least one stabilizer is frozen by the conventional method to be the blocks of ice, and the thus prepared blocks of ice are crushed into pieces by an ice crusher. The thus obtained ice pieces are brought into contact with the above-mentioned refrigerant for an extremely short period of time, preferably for one to two seconds to refrigerate the surfaces of the pieces to a temperature of about −25° to −20° C. to have the surface solidified, followed by sifting the thus refrigerated granules of ice to recover those having a size of average diameter of 5 to 10 mm.

On refrigerating the ice pieces, care should be taken because the granules of ice obtained thereby are apt to have cracks when they are kept in contact with the refrigerant for longer period of time to have their surface cooled rapidly to −30° C. or lower.

The edible coloured aqueous liquid material for use in the present invention includes water, syrup, fruit juice, aqueous liquid containing chocolate, cocoa, coffee or powdered tea and alcoholic beverage such as whisky or brandy containing colouring agent(s), flavouring(s) and/or sweetening(s).

The stabilizer admixed with the above-mentioned edible coloured aqueous liquid material includes gelatin, carrageenan, gum arabic, guar seed gum, locust bean gum, furcelleran, tamarind seed gum, pectin, xanthan gum, sodium alginate and carboxymethylcellulose. The above-mentioned stabilizer may be used in combination of more than one.

The content of the stabilizer in the above-mentioned edible, coloured aqueous liquid material is in a range of 0.01 to 3.0% by weight. In cases where it is less than 0.01% by weight, the colouring of the block of ice obtained by freezing the aqueous liquid material becomes non-uniform, while more than 3.0% by weight, the expected granules of ice can not be obtained because of the jellification of the ice pieces obtained by crushing the block of ice. Accordingly, the admixture of the stabilizer should be carried out carefully.

In the method of the present invention, as has been stated, the ice pieces obtained by crushing the block of ice prepared as has been stated are brought into contact for an extremely short period of time with the above-mentioned refrigerant to have their surface solidified in advance of the sifting the pieces. This procedure of refrigerating the ice pieces is for the prevention of the blocking of the ice pieces by mutual adhesion, and accordingly, the ice pieces having their surfaces solidified by refrigeration according to the present invention are possibly sifted advantageously. However, it should be avoided to have the temperature of the surface of the ice pieces at −30° C. or lower, as has been said in the case of refrigeration. Since the refrigeration of the surface of the ice pieces is carried out by the contact of the surface with the above-mentioned refrigerant for an extremely short period of time, it is preferably to spray the refrigerant onto the surface of the ice pieces for the refrigeration.

The refrigerated ice pieces obtained by the above-mentioned procedure are sifted by a sieve, preferably having meshes of about 3 mm, and the ice pieces passed through the sieve are discarded. The larger part of the thus obtained granules of ice remaining on the sieve, after settling to be about 5 to 10 mm in average diameter, are admixed with soft frozen confection such as soft ice cream. In the admixing, the temperature of the granules of ice is controlled to −20° to −10° C. in advance, and the temperature of soft ice cream is controlled to −7° to −3° C. The amount of the granules of ice to be admixed is about 10 to 20% by weight of the amount of soft frozen confection, particularly 15% by weight being preferable. The thus obtained mixture is filled up into containers at a temperature in, for instance, a range of −10° to −4° C.

The frozen confection obtained according to the method of the present invention as mentioned above contains the scattered granules of ice shining brilliantly as jewels, and accordingly they are very much attractive to the consumers and have a high commercial value. In addition, since the granules of ice within the frozen confection are uniformly coloured and have their surfaces refrigerated, the permeation of the dissolved colouring agent into the frozen confection followed by spoiling the appearance does not occur.

The followings are the more concrete explanation of the present invention while referring to the examples, as well as the indication of the advantages of the present invention.

EXAMPLE

The method of the present invention is explained while referring to the drawings as follows:
Preparation of the block of ice:

An amount of drinking water containing 0.25% by weight of an admixed gelatin as a stabilizer was thermally sterilized for 15 sec. After cooling the thus sterilized drinking water to a temperature of 5° C., a colouring agent and a flavouring were admixed with the water. The thus obtained coloured drinking water was frozen by a rapid freezer to a temperature of about −25° C. to be a block of ice. The thus obtained block of ice was uniformly coloured in naked eyes.
Preparation of the granules of ice:

The above-mentioned block of ice was supplied to the ice crusher shown in the drawing as 1 to be crushed into pieces, and then the ice pieces were introduced into the cooling chamber 5 from one of its ends, the above-mentioned ice crusher having been controlled in advance to crush the block into pieces of 5 to 10 mm in diameter of size. A screw conveyer is provided in the cooling chamber 5 and liquid nitrogen was sprayed into the chamber via the pipe line 3 and the valve 4 installed outside of the chamber. Accordingly, the surfaces of ice pieces introduced into the cooling chamber were brought into contact with the sprayed liquid nitrogen for a period of time of one to two sec., refrigerated and discharged from the other end of the chamber 5.

The refrigerated ice pieces discharged from the cooling chamber 5 while having their surface temperature of −25° to −20° C. were supplied to the sieve 6 installed below the other end of the chamber and sifted to be the granules of ice having an average diameter of 5 to 10 mm in size. In this case, no formation of blocking of the ice pieces was observed and the sifting was carried out effectively. The powdery ice pieces passing through the sieve were received in the pool 9 installed below the sieve and discarded.

The thus obtained granules of ice as above were uniformly coloured and showed a brilliancy as if they were jewels.
Preparation of the ice cream scattered with the granules of ice:

Then, the thus prepared granules of ice were supplied into the mixer 7 together with the soft ice cream prepared in another line (not shown) to be mixed together with a weight ratio of the granules to the ice cream of 0.15:1.

The product obtained by freezing the thus prepared mixture to a temperature of −20° C. contained the above-mentioned granules of ice scattered within the ice cream base and showed as extremely fascinating appearance.
Comparative Example:

The present example shows the results of comparison of the method of the present invention to the conventional method as well as the result of comparison of the ice creams obtained by the method of the present invention and the conventional method in order to show the advantages of the method of the present invention and the ice cream prepared by the method of the present invention.

1. Test preparation of coloured ice pieces:

Blocks of ice were prepared in the same manner as in Example except for not using gelatin as the stabilizer. The thus obtained blocks of ice were coloured only in the neighbourhood of their center part, and accordingly, it was actually impossible to obtain uniformly coloured ice pieces by crushing the block of ice.

Whereas, the blocks of ice prepared by the procedures described in Example were, as has been stated, uniformly coloured in naked eyes, and accordingly, the uniformly coloured ice pieces were easily obtained by crushing the blocks.

2. Blocking test of ice pieces:

Blocks of ice were prepared in the same manner as in Example except for not using gelatin as the stabilizer and ice pieces were obtained by crushing the blocks of ice thus prepared. On sifting the thus prepared ice pieces by the sieve used in Example, each ice piece adhered to each other to cause blocking and so, the sifting was difficult as shown in Table 1.

In addition, the relationship between the surface temperature of the ice pieces and the occurrence of blocking on the sifting of these ice pieces is determined and the results are shown also in Table 1.

TABLE 1

| | Occurrence of Blocking and the Surface Temperature | |
|---|---|---|
| | Surface temperature of ice pieces obtained by crushing block of ice | State of Blocking on sifting the ice pieces |
| Specimen A | −5 to 0° C. | More than 40% of the ice pieces adhered mutually to cause blocking: Sifting actually very much difficult |
| Specimen B | −10 to −5° C. | 20 to 30% of the ice pieces adhered to cause blocking |
| Specimen C | −15 to −10° C. | 10% of the ice pieces adhered to cause blocking |
| Specimen D | −25 to −20° C. | Occurrence of blocking was not observed |

Notes:
(1) Specimen A was prepared in the same manner as described in the above-mentioned Comparative Example.
(2) Specimens B and C were obtained by refrigerating Specimen A using a rapid freezer.
(3) Specimen D was obtained by spraying liquid nitrogen onto Specimen A for 2 sec.

3. Stability test of the granules of ice within the ice cream:

Blocks of ice were prepared in the same manner as in Example except for not using gelatin as the stabilizer. Since the thus obtained blocks were coloured only in the neighbourhood of their center part, after crushing the block, only the coloured ice pieces were recovered for use. Since these ice pieces adhered mutually to cause blocking and difficulty sifted, only those having a size of 5 to 10 mm in diameter were selectively collected for use. In addition, the thus obtained granules of ice had various degree of coloration, not being uniform.

The above-mentioned coloured granules of ice were admixed with an ice cream in the same manner as in Example, however, without subjecting them to surface-refrigeration. On the thus obtained product and on the product prepared in quite the same manner as in Example, the degree of permeation of the coloured matter from the granules of ice to the ice cream was determined. The above-mentioned degree of permeation was represented by the value of colour difference determined by using a colour machine Model CD-100 (manufactured by Murakami Colouring Technical Institute Co., Ltd.). The results are shown in Table 2.

TABLE 2

| Degree of Permeation of Coloured Matter | | | | |
|---|---|---|---|---|
| Products prepared by the conventional method | | | | |
| | Colour tone and colour difference | | | |
| Specimen | L | a | b | ΔE |
| Ice cream before mixing the granules of ice | +71.7 | −4.5 | −11.2 | — |
| Ice cream after mixing with red coloured granules of ice | +69.2 | +2.8 | −19.4 | 11.2 |
| Ice cream after mixing with orange coloured granules of ice | +67.0 | +4.2 | −6.6 | 10.9 |
| Ice cream after mixing with melon coloured granules of ice | +70.1 | −12.6 | −17.3 | 10.2 |
| Products prepared by the method of the present invention | | | | |
| Ice cream before mixing the granules of ice | +71.5 | −3.4 | −11.3 | — |
| Ice cream after mixing with red coloured granules of ice | +68.4 | −2.7 | −11.1 | 3.2 |
| Ice cream after mixing with orange coloured granules of ice | +68.8 | −2.5 | −12.8 | 3.2 |
| Ice cream after mixing with melon coloured granules of ice | +68.8 | −5.9 | −13.1 | 4.1 |

Notes:
L denotes Luminosity,
a denotes red side when (+) and green side when (−), respectively, and
b denotes yellow side when (+) and blue side when (−), respectively.
E represents the value derived from the following formula:

$$E = \sqrt{\Delta a^2 + \Delta b^2 + \Delta L^2}$$

wherein Δa, Δb and ΔL denote the difference between the measured value of each specimen containing coloured granules of ice and that of the specimen not containing the same, respectively.
Generally speaking, when the colour difference (ΔE) is 0 to 3, the difference cannot be recognized visually, while when ΔE equals 5 the difference can be slightly recognized, and when ΔE is larger than 5 the difference can be recognized.
In case of the ice cream in accordance with the present invention, ΔE was smaller than 5, while in the case of the ice cream in accordance with the conventional method ΔE was larger than 10 and the permeation of colour was clearly recognized.

From the above-mentioned results, it is recognizable that the coloured granules of ice prepared by using the stabilizer and subjected to the surface-refrigeration in accordance with the present invention is stable within ice cream.

4. Melting property test of the ice pieces:

The following Table 3 illustrates the results of the tests for melting properties of the ice pieces prepared by using each of various stabilizers in amount of 0.25% by weight, respectively, compared to the melting properties of the ice pieces prepared without using any stabilizer:

TABLE 3

| | | Melting Properties of Ice Pieces | | |
|---|---|---|---|---|
| | | Amount of dripped water (ml)* | | Order of difficulty in melting |
| No. | Stabilizer | After 10 min. | After 45 min. | |
| 1 | none | 3 | 46 | 10 |
| 2 | gelatin | 0 | 15 | 1 |
| 3 | carrageenan | 0 | 21 | 4 |
| 4 | gum arabic | 1 | 37 | 6 |
| 5 | guar seed gum | 2 | 42 | 8 |
| 6 | locust bean gum | 0.5 | 35 | 5 |
| 7 | furcelleran | 0 | 19 | 2 |
| 8 | tamarind seed gum | 0.5 | 37 | 6 |
| 9 | pectin LM | 0 | 20 | 3 |

TABLE 3-continued

| | | Melting Properties of Ice Pieces | | |
|---|---|---|---|---|
| | | Amount of dripped water (ml)* | | Order of difficulty in melting |
| No. | Stabilizer | After 10 min. | After 45 min. | |
| 10 | xanthan gum | 0.5 | 43 | 9 |

From Table 3, it is recognizable that the stabilizer introduced into water also exhibits its action in inhibiting the melting of ice which is prepared from the water containing the stabilizer.

What is claimed is:

1. In the method for making a frozen confection having scattered granules of ice wherein a soft frozen confection is admixed with granules of ice, the improvement which comprises admixing a soft frozen confection selected from the group consisting of soft ice cream, soft iced milk, soft lactic ice and soft sherbet with uniformly coloured granules of ice, surfaces of which are refrigerated to a temperature not exceeding $-30°$ C., said uniformly coloured granules of ice being prepared by freezing an edible, coloured aqueous liquid material containing at least one stabilizer to form a uniformly coloured block of ice, crushing the thus obtained uniformly coloured block of ice into pieces and then bringing the surfaces of the resultant ice pieces into contact with a refrigerant to refrigerate said resultant ice surfaces to a temperature not exceeding $-30°$ C.

2. The method according to claim 1, wherein said edible, coloured aqueous liquid material contains 0.01 to 3.0% by weight of at least one stabilizer.

3. The method according to claim 1, wherein said refrigerant is selected from the group consisting of liquid nitrogen, liquid carbon dioxide and liquid air.

4. The method according to claim 2, wherein said refrigerated ice pieces are sifted to obtain granules of ice having a size of about 5 to about 10 mm in diameter.

5. The method according to claim 2, wherein said stabilizer is selected from the group consisting of gelatin, carrageenan, gum arbic, guar seed gum, locust bean gum, furcelleran, tamarind seed gum, pectin, xanthan gum, sodium alginate and carboxymethylcellulose.

6. The method according to claim 2, wherein said coloured granules of ice are used in a weight ratio of 10 to 20% to said soft frozen confection.

7. The method according to claim 2, wherein the surfaces of said ice pieces are refrigerated to a temperature of $-25°$ to $-20°$ C. by spraying said refrigerant for one to two seconds thereto.

8. A frozen confection having scattered and uniformly coloured granules of ice containing at least one stabilizer, prepared by the method of claim 2.

* * * * *